(12) United States Patent
Merli et al.

(10) Patent No.: US 9,034,801 B2
(45) Date of Patent: May 19, 2015

(54) CLAY INHIBITORS FOR THE DRILLING INDUSTRY

(71) Applicant: LAMBERTI SpA, Albizzate (IT)

(72) Inventors: Luigi Merli, Albizzate (IT); Franscesca Giani, Albizzate (IT); Pierangelo Pirovano, Albizzate (IT); Giovanni Floridi, Novara (IT); Giuseppe Li Bassi, Gavirate (IT)

(73) Assignee: LAMBERTI SPA, Albizzate (IT)

( * ) Notice: Subject to any disclaimer, the term of this patent is extended or adjusted under 35 U.S.C. 154(b) by 49 days.

(21) Appl. No.: 13/921,030

(22) Filed: Jun. 18, 2013

(65) Prior Publication Data

US 2013/0281326 A1 Oct. 24, 2013

Related U.S. Application Data

(63) Continuation-in-part of application No. 13/271,964, filed on Oct. 12, 2011, now Pat. No. 8,466,092.

(60) Provisional application No. 61/392,795, filed on Oct. 13, 2010.

(51) Int. Cl.
*C09K 8/06* (2006.01)

(52) U.S. Cl.
CPC ............... C09K 8/06 (2013.01); *C09K 2208/12* (2013.01)

(58) Field of Classification Search
CPC ........................................................ C09K 8/12
See application file for complete search history.

(56) References Cited

U.S. PATENT DOCUMENTS

| | | |
|---|---|---|
| 3,105,046 A | 9/1963 | Fischer |
| 4,605,068 A | 8/1986 | Young et al. |
| 5,771,971 A | 6/1998 | Horton et al. |
| 5,908,814 A | 6/1999 | Patel et al. |
| 6,247,543 B1 | 6/2001 | Patel et al. |
| 6,484,821 B1 | 11/2002 | Patel et al. |
| 6,609,578 B2 | 8/2003 | Patel et al. |
| 2002/0155956 A1 | 10/2002 | Chamberlain et al. |
| 2003/0106718 A1 | 6/2003 | Patel et al. |
| 2006/0289164 A1 | 12/2006 | Smith et al. |
| 2007/0207932 A1 | 9/2007 | Merli et al. |
| 2008/0132711 A1 | 6/2008 | Poelker et al. |
| 2012/0094877 A1* | 4/2012 | Merli et al. .................... 507/129 |

OTHER PUBLICATIONS

Invista, "Dytek BHMT," 2005.
Robertis et al., "Stability-charge and stability structure relationships in the binding of tri—and tetracarboxylic ligands by open chain polyammonium cations," Sep. 2001, J. Chem, Eng. Data, 2001, 46, 1365-1370.

* cited by examiner

*Primary Examiner* — Randy Gulakowski
*Assistant Examiner* — Jeffrey Washville
(74) *Attorney, Agent, or Firm* — Mossman, Kumar & Tyler, PC

(57) ABSTRACT

The hydration of clays in drilling operations can be inhibited by employing an aqueous based drilling fluid containing from about 0.2 to about 5 wt % of a hydration inhibitor that comprises bis-hexamethylene-triamine, bis-hexamethylene-triamine salts, or mixtures thereof.

6 Claims, 1 Drawing Sheet

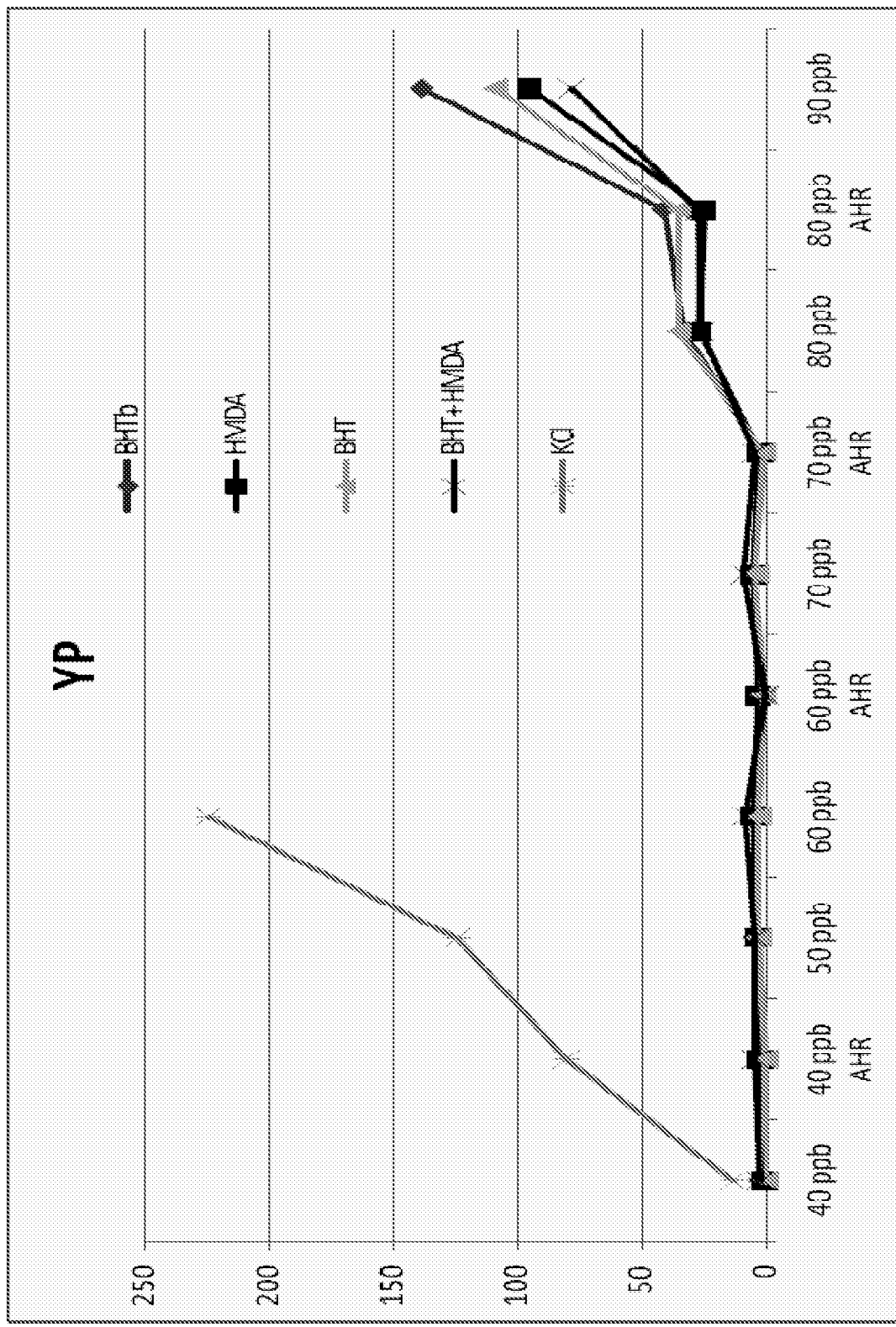

CLAY INHIBITORS FOR THE DRILLING INDUSTRY

CROSS-REFERENCE FOR RELATED APPLICATIONS

This applications claims priority from U.S. patent application Ser. No. 13/271,964, now U.S. Ser. No. 8,466,092 which also claims priority from U.S. patent application Ser. No. 61/392,795 filed on Oct. 13, 2010 the disclosure of which is incorporated herein by reference in its entirety.

BACKGROUND OF THE INVENTION

1. Field of the Invention

The present invention relates to a method for inhibiting hydration of clays in drilling operations comprising the use of an aqueous based drilling fluid containing clay hydration inhibitors for the drilling industry, that is to products which are effective for the inhibition of swelling of clays (also called shales) which come into contact with the fluids used in the drilling and construction of oil and gas wells for the petroleum industry. The clay hydration inhibitors (also called clay inhibitors or hydration inhibitors) of the invention are bis-hexamethylene-triamine and the salts thereof.

2. Background of the Art

In the rotary drilling of wells a drilling fluid circulates throughout the underground well to carry the cuttings from the bit and to transport these cuttings to the surface. Contemporaneously, the drilling fluid cools and cleans the drill bit, as well as it reduces the friction between the drill string and the drilled hole, and it also stabilizes the uncased sections of the well. Usually the drilling fluids form a low permeability filter cake in order to seal any permeability associated with the surrounding geological formations.

The drilling fluids may be classified according to their fluid base: oil based fluids which contain solid particles suspended in an oil continuous phase and, possibly, water or brine may be emulsified with the oil. Alternatively, water base fluids contain solid particles suspended in water or brine. Various other components may be added, deliberately or otherwise, to water based drilling fluids: a) organic or inorganic colloids, such as clays, used to impart viscosity and filtration properties; b) soluble salts or insoluble inorganic minerals used to increase the fluid density; c) other optional components may be added to impart desirable properties, such as dispersants, lubricants, corrosion inhibitors, defoamers or surfactants; d) during the drilling operations formation solids may disperse into the drilling fluid.

Formation solids that become dispersed in a drilling fluid include cuttings from drilling and soil and solids from the surrounding unstable formation. When the formation yields solids that are clay minerals which swell, this can potentially compromise drilling time and increase costs. Clays are typically composed of sheets that can have exposed surface hydroxyls. Multivalent atoms may create a negative potential at the clay surface and, in this case, cations can be adsorbed onto the surface. These cations may be exchangeable. Substitutions within the clay structure and the presence of exchangeable cations affect the tendency of the clay to swell in water. For example surface hydration gives swelling with water molecules adsorbed on clay surfaces. All types of clays can swell in this manner.

Another type of swelling is called osmotic swelling, when the interlayer ion concentration leaches water between the clay unit layers, swelling the clay. Only some clays can undergo osmotic swelling. All types of clay swelling can cause a series of problems. This increases drag between the drill string and the sides of the borehole. This can cause the loss of fluid circulation and sticking of the drill string and bit.

This is why the development of effective clay swelling inhibitors is important to the oil and gas exploration industry. The present invention works towards a solution to these difficulties. Many clay inhibitors are known, including the use of inorganic salts such as potassium chloride, which effectively inhibit clay swelling and which are well known to those skilled in the art. Numerous patents have been filed which describe techniques or products which can be used to inhibit clay swelling. Without completely summarizing the patent literature, and by way of example, we can cite the inhibitor compositions based on: a) inorganic phosphates, described in U.S. Pat. No. 4,605,068 (YOUNG et al.); b) polyalkoxy diamines and their salts, in U.S. Pat. No. 6,484,821, U.S. Pat. No. 6,609,578, U.S. Pat. No. 6,247,543 and US 20030106718, all by Patel at al.; c) choline derivatives in U.S. Pat. No. 5,908,814 (PATEL et al.); d) oligomethylene diamines and their salts, in U.S. Pat. No. 5,771,971 (HORTON et al.) and US 20020155956 (CHAMBERLAIN et al.). In particular U.S. Pat. No. 5,771,971 describes the use of diamines with a chain length of 8 or less, but does not mention the use of organic triamines.

US 2007/0207932 (MERLI et al.) relates to a method for inhibiting hydration of clays in drilling operations comprising the use of an aqueous based drilling fluid containing 1,2-cyclohexanediamine and/or its salts.

SUMMARY OF THE INVENTION

In one aspect, the invention is a method for inhibiting the hydration of clays in drilling operations including the use of an aqueous based drilling fluid containing from about 0.2 to about 5 wt % of a hydration inhibitor that comprises bis-hexamethylene-triamine, bis-hexamethylene-triamine salts, or mixtures thereof.

In another aspect, the invention is a hydration inhibitor comprising at least 10 wt % of bis-hexamethylene-triamine hydrochloride salt.

In still another aspect, the invention is an aqueous based drilling fluid comprising from 0.2 to 5 wt % of a hydration inhibitor comprising at least 10 wt % of bis-hexamethylene-triamine, bis-hexamethylene-triamine salts, or mixtures thereof.

BRIEF DESCRIPTION OF THE DRAWINGS

The examples were carried on as described below and are illustrated in the drawings. In the drawings the following abbreviations are used to indicate the clay inhibitor contained in the mud.

KCl=potassium chloride from Aldrich Chemicals Co.

BHTb=hydrochloride salt of high boiling by-product of hexamethylenediamine purification comprising 24.5 wt % of bis-hexamethylene-triamine (Bhtb), prepared by adding 53.4 g HCl 30 wt % and 7 g of water onto 39.5 g of Bhtb (pH about 10).

HMDA=hydrochloride salt of hexamethylenediamine prepared by adding HCl 30 wt % onto hexamethylenediamine (98% from Aldrich Chemicals Co.) to pH about 10.

BHT=hydrochloride salt of bis-hexamethylene-triamine, prepared by adding HCl 30 wt % onto bis-hexamethylenetriamine (98% from Aldrich Chemicals Co.) to pH about 10.

BHT+HMDA=hydrochloride salt of a mixture of bis-hexamethylene-triamine and hexamethylenediamine (respectively 24.5 wt % and 56.3 wt %) in water, prepared by adding HCl 30 wt % onto the mixture of the amines to pH about 10.

FIG. 1. gives the yield point values obtained from the Bentonite Swelling Test. In FIG. 1 AHR means "After Hot Rolling".

DETAILED DESCRIPTION OF THE INVENTION

It has now been found that the bis-hexamethylene-triamine and salts thereof positively affect the stabilizing effect on clay swelling. Bis-hexamethylene-triamine and its salts have revealed to be excellent clay hydration inhibitors for the petroleum industry, being able to effectively inhibit clay swelling in subterranean formations.

It is therefore a fundamental object of the present invention a method for inhibiting the hydration of clays in drilling operations comprising the use of an aqueous based drilling fluid containing from 0.2 to 5 wt %, preferably from 0.5 to 3 wt %, of a hydration inhibitor comprising at least 10 wt % of bis-hexamethylene-triamine, bis-hexamethylene-triamine salts or mixture thereof.

In yet another aspect the present invention is an aqueous based drilling fluid comprising from 0.2 to 5 wt %, preferably from 0.5 to 3 wt %, of a hydration inhibitor comprising at least 10 wt % bis-hexamethylene-triamine, bis-hexamethylene-triamine salts or mixture thereof.

The salts of bis-hexamethylene-triamine useful for the realization of the invention are of the inorganic or of the organic kind, the preferred salts being salts formed with hydrochloric acid, phosphoric acid, formic acid, acetic acid, more preferably with hydrochloric acid.

Preferably all the amine groups of bis-hexamethylene-triamine are salified.

Application tests on the clay inhibitors of the invention and on prior art clay inhibitors were carried out by an aqueous solution using purified bis-hexamethylene-triamine (about 98 wt %) hydrochloride salt.

It has been further observed that, advantageously, the clay inhibitor of the invention can be the hydrochloride salt of a high boiling by-product of hexamethylenediamine purification (product that is commercially known as HMDA bottoms), that typically comprises variable amounts of bis-hexamethylene-triamine and may be described by the CAS No. 68411-90-5. In some embodiments, other salts can be used. In other embodiments, the salt of the high boiling by-product of hexamethylenediamine purification may be a salt or a mixture of salts other than chloride.

Hexamethylenediamine is extensively used in the production of nylon 66 and is generally obtained via the hydrogenation of adiponitrile and the subsequent distillation of the reaction products. The distillation of hexamethylenediamine leaves a distillation residue (in this text "high boiling by-product of hexamethylenediamine purification" or "HMDA bottoms") that contains significant amounts of bis-hexamethylene-triamine together with hexamethylenediamine, higher polyamines, water and NaOH.

To date HMDA bottoms have found limited use.

It has now been surprisingly found that HMDA bottoms and their salts can be used as a very efficient clay hydration inhibitors for aqueous based drilling fluids.

Bis-hexamethylene-triamine has proved to be by itself a very efficient hydration inhibitor, showing performances that are close to those of hexamethylenediamine; moreover, the compounds that are contained in HMDA bottoms along with hexamethylenediamine and bis-hexamethylenetriamine do not adversely affect the effectiveness of the product.

The suitable, typical composition of HMDA bottoms is the following (wt %):

| | |
|---|---|
| Bis-hexamethylene-triamine | 20-50 |
| Hexamethylenediamine | 20-70 |
| 1,2-Cyclohexanediamine | 0-30 |
| NaOH | 0-10 |
| Water | 10-30 |
| Higher polyamines | 0-20 |

According to an advantageous embodiment of the invention the hydration inhibitor of the invention is an aqueous solution that comprises at least 10 wt % of bis-hexamethylene-triamine hydrochloride salt and, most preferably, the hydration inhibitor is an aqueous solution comprising form 40 to 60 wt % of water and the hydrochloride salt of a high boiling point by-product of hexamethylenediamine purification. It has been found that the above liquid hydration inhibitor is stable at ambient temperature and even at −18° C./+50° C., which is particularly advantageous for its transport, storage and use.

The aqueous based drilling mud contains an aqueous based continuous phase and the normally used additives, well known by those skilled in the art, such as weighting materials, viscosifying agents, dispersants, lubricants, corrosion inhibitors, defoamers and surfactants; the order in which the additives and the clay inhibitors of the invention are added into the mud is not critical. Useful weighting materials may be selected from: barite, hematite, iron oxide, calcium carbonate, magnesium carbonate, magnesium organic and inorganic salts, calcium chloride, calcium bromide, magnesium chloride, zinc halides, alkali metal formates, alkali metal nitrates and combinations thereof.

The aqueous based continuous phase may be selected from: fresh water, sea water, brine, mixtures of water and water soluble organic compounds and mixtures thereof.

EXAMPLES

The application tests were conducted to determine the ability of bis-hexamethylenediamine (and of its mixtures) to inhibit the swelling of a bentonite clay in an aqueous fluid, and to compare its bentonite swelling inhibition capability with that of hexamethylenediamine and potassium chloride, which are well known clay inhibitors.

The methods used in the application test are the following:

Bentonite Swelling Test 350 g of tap water and 8 g (8 ppb) of clay inhibitor are added to a clean glass jar; and 40 g (40 ppb) of bentonite are added and the mixture (mud) is shaken with an Hamilton Beach Shaker for 30 minutes. All samples were adjusted to at pH of 9. The mixture is rolled at 150° F. for 16 hours, then its rheology is measured with a Fann 35A Viscometer. The procedure is carried out again, each time with further addition of 10 g of bentonite, until the mud becomes too viscous to measure.

Recovery Test

A sample of dried shale is ground and sieved through both a 4 mm sieve and a 2 mm sieve. Ground shale particles which passed through the 4 mm sieve but collected on the 2 mm sieve, e.g., shale particles that are sized less than 4 mm but greater than 2 mm, are selected for use in this particular test. For each fluid to be tested, a 100 grams sample of sized shale is weighed and selected.

8 g of shale inhibitor are added to 350 ml of synthetic sea water and, then, the fluid is mixed with an Hamilton Beach shaker for 15 minutes. All samples are adjusted to at pH of 9.

100 g of sized shale sample are added to the fluid in a bottle. The bottle is capped and shaken to disperse the shale particles of the sample. The bottle is placed in a pre-heated oven and hot rolled at 150° F. for 16 hours. When the 16 hours hot roll is complete, the sample is cooled to room temperature.

The contents of the sample bottle are then poured onto a 10 mesh (2 mm) sieve. The inside of the sample bottle is carefully rinsed with the fluid collected after screening out the 2 mm shale fraction. The bottle is repeatedly rinsed and poured until all shale is removed from the bottle.

The sample is then placed in a pre-weighed dish and transferred to a pre-heated oven at 250° F. to dry to a constant weight. After drying, the shale sample is then weighed. The percentage recovery of shale for each fluid tested is then determined by the following calculation:

Percent recovered=(weight in grams of dried shale recovered)/(100-$w_h$)×100 where $w_h$ is the initial moisture content of the sized shale. The initial moisture content of the sized shale is determined drying a pre-weighed shale sample in a pre-heated oven at 250° F. to a constant weight. The sample is then weighed.

The percentage of initial moisture content is calculated as follows:

$$w_h=(\text{Weight in grams of dried shale})/(\text{initial weight of shale used})\times 100$$

The higher the percent recovered the higher the hydration inhibition performance of the tested product.

The following clay inhibitors were tested:

KCl=potassium chloride from Aldrich Chemicals Co.

BHTb=hydrochloride salt of high boiling by-product of hexamethylenediamine purification comprising 24.5 wt % of bis-hexamethylene-triamine (Bhtb), prepared by adding 53.4 g HCl 30 wt % and 7 g of water onto 39.5 g of Bhtb (pH about 10)

HMDA=hydrochloride salt of hexamethylenediamine prepared by adding HCl 30 wt % onto hexamethylenediamine (98% from Aldrich Chemicals Co.) to pH about 10.

BHT=hydrochloride salt of bis-hexamethylene-triamine, prepared by adding HCl 30 wt % onto bis-hexamethylene-triamine (98% from Aldrich Chemicals Co.) to pH about 10.

BHT+HMDA=hydrochloride salt of a mixture of bis-hexamethylene-triamine and hexamethylenediamine (respectively 24.5 wt % and 56.3 wt %) in water, prepared by adding HCl 30 wt % onto the mixture of the amines to pH about 10.

The result of the Recovery Test in reported in Table 1.

TABLE 1

| Hydration inhibitor | % of clay recovery |
|---|---|
| BHT b | 41 |
| BHT | 43 |
| HMDA | 31 |
| KCl | 6 |
| BHT + HMDA | 41 |

The results of the Bentonite Swelling Test are reported in FIG. 1.

The results show that bis-hexamethylene-triamine is itself a very effective hydration inhibitor and that, conveniently, HMDA bottoms can be used as an efficient clay inhibitor being a convenient and suitable source of bis-hexamethylene-triamine.

The comparison between the samples BHT+HMDA and BHTb shows that the additional material contained in the HMDA bottom do not alter the performance of the two main active ingredients (hexamethylenediamine and bis-hexamethylene-triamine).

While the compositions and methods of this invention have been described in the terms of the preferred embodiments, it will be apparent to those of skill in the art that variations may be applied to the process described herein without departing from the concept and scope of the invention. All such similar substitutes and modifications apparent to those skilled in the art are deemed to be within the scope and concept of the invention as it is set out in the following claims.

What is claimed is:

1. A method for inhibiting the hydration of clays in drilling operations comprising contacting a subterranean formation during drilling operations with an aqueous based drilling fluid containing from about 0.2 to about 5 wt % of a hydration inhibitor comprising a member selected from the group consisting of a high boiling by-product of hexamethylenediamine purification (HMDA bottoms), salts of a high boiling by-product of hexamethylenediamine purification, and mixtures thereof;

wherein the anion of the salt is other than chloride.

2. The method of claim 1 wherein the hydration inhibitor is present at a concentration of from about 0.5 to about 3 percent by weight.

3. The method of claim 1 wherein the aqueous based drilling fluid additionally comprises at least one material selected from the group consisting of weighting materials, viscosifying agents, dispersants, lubricants, corrosion inhibitors, defoamers and surfactants and mixtures thereof.

4. The method of claim 3 wherein the weighting materials are selected from the group consisting of: barite, hematite, iron oxide, calcium carbonate, magnesium carbonate, magnesium organic and inorganic salts, calcium chloride, calcium bromide, magnesium chloride, zinc halides, alkali metal formates, alkali metal nitrates and combinations thereof, and the aqueous continuous phase is selected from fresh water, sea water, brine, mixtures of water and water soluble organic compounds, and mixtures thereof.

5. A hydration inhibitor comprising at least 10 wt % of a hydration inhibitor comprising a member selected from the group consisting of a high boiling by-product of hexamethylenediamine purification (HMDA bottoms), salts of a high boiling by-product of hexamethylenediamine purification, and mixtures thereof;

wherein the anion of the salts is other than chloride.

6. An aqueous based drilling fluid containing from 0.2 to 5 wt % of a hydration inhibitor comprising a member selected from the group consisting of a high boiling by-product of hexamethylenediamine purification (HMDA bottoms), salts of a high boiling by-product of hexamethylenediamine purification, and mixtures thereof;

wherein the anion of the salts is other than chloride.

* * * * *